United States Patent
Kalm et al.

(10) Patent No.: US 6,609,849 B2
(45) Date of Patent: Aug. 26, 2003

(54) HOLD BLOCK

(75) Inventors: Jouni Kalm, Hyvinkaa (FI); Matti Rasanen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/859,588

(22) Filed: May 18, 2001

(65) Prior Publication Data

US 2002/0029937 A1 Mar. 14, 2002

Related U.S. Application Data

(63) Continuation of application No. PCT/FI99/00958, filed on Nov. 19, 1999, now abandoned.

(30) Foreign Application Priority Data

Nov. 20, 1998 (FI) .................................................. 982521

(51) Int. Cl.[7] .............................................. F16C 11/00
(52) U.S. Cl. ........................... 403/91; 403/84; 403/403; 187/325; 187/333; 248/241
(58) Field of Search ................... 248/241, 247, 248/295.11, 298.1; 521/656.4, 204.1, 712, 702, 658.9, 645; 403/82–87, 91, 93, 187, 188, 382, 384, 403; F16B 43/00; B66B 13/30; F06B 1/70; E04F 13/00

(56) References Cited

U.S. PATENT DOCUMENTS 4,148,164 A * 4/1979 Humphrey ..................... 52/94
6,047,513 A * 4/2000 Gibson ......................... 52/646
6,138,425 A * 10/2000 Wendt ...................... 52/506.07

FOREIGN PATENT DOCUMENTS

| DE | 19809442 A1 | 10/1998 | |
|---|---|---|---|
| GB | 764391 | * 12/1956 | |
| GB | A2322894 | 9/1998 | |
| GB | 2 322 894 | * 9/1998 | ............. E06B/1/70 |
| JP | 52-41333 | * 3/1977 | ........... B66B/13/30 |
| JP | 6-26273 | * 2/1994 | ............. E06B/1/60 |
| JP | 5193880 | 8/1998 | |
| WO | WO 93/01422 | * 1/1993 | ........... F16B/43/00 |
| WO | A1-9301422 | 1/1993 | |

* cited by examiner

Primary Examiner—Gregory J. Binda
Assistant Examiner—Michael P. Ferguson
(74) Attorney, Agent, or Firm—Birch, Stewart, Kolasch & Birch, LLP

(57) ABSTRACT

A hold block for fastening a structural elevator component, such as a landing door sill, an overhead structure of a landing door opening or a car door sill, to a base. The hold block comprises a fixing element for fixing the hold block to the base and a supporting element, disposed at an angle relative to the fixing element, for attachment of the structural component to the hold block, both of the elements being made of the same continuous plate-like material. In addition, the hold block comprises an adjustment elbow between the fixing element and the supporting element to allow adjustment of the angle between the planes defined by the elements, and a locking element for locking this angle.

25 Claims, 3 Drawing Sheets

HOLD BLOCK

This application is a Continuation of PCT International Application No. PCT/FI99/00958 filed on Nov. 19, 1999, which was published in English and which designated the United States and now abandoned and on which priority is claimed under 35 U.S.C. §120, the entire contents of which are hereby incorporated by reference.

FIELD OF INVENTION

The present invention relates to a hold block.

DESCRIPTION OF BACKGROUND ART

In traditional elevator structures, mounting the landing door sill requires the use of a number of various hold blocks. The base, i.e. the surface on which the door sill is to be mounted, is generally a slip form cast concrete surface made to approximate measurements. Therefore, the hold blocks are required to have good adjustment and adaptation properties so that the door sills on different floors can be precisely adjusted to the correct height and correct position in relation to each other.

At present, to allow sufficient adjustment of the door sill, supporting angle pieces of different heights or different widths as needed in each case are first fixed to the shaft structure, whereupon hold blocks of suitable width and height for each case are fastened to these supporting angle pieces and fitted to the desired position, and finally the door sill is fastened to the hold blocks. Consequently, mounting the door sills on different floors in an elevator shaft may require the use of as many as several tens of parts of different sizes and shapes. Mounting the overhead structure of the landing door opening also involves similar problems.

BRIEF SUMMARY OF THE INVENTION

The object of the invention is to eliminate the problems referred to above. A specific object of the invention is to disclose a new type of hold block to allow the use of one and the same hold block in all applications which heretofore have required dozens of different parts.

The hold block of the invention has been mainly designed for the attachment of the landing door sill to a shaft structure, such as the edge of the landing door opening, and for the adjustment of the height position of the door sill, but it can just as well be used for the mounting of the overhead structure of the landing door opening or for fastening the car door sill. Therefore, in the following, the underlying element to which the hold block of the invention is fastened is simply denoted by the general term 'base'.

The hold block of the invention comprises a fixing element for fixing the hold block to a base and a supporting element, disposed at an angle relative to the fixing element, for attachment of the structural component to be mounted in each case to the hold block, both of said elements being made of the same continuous plate-like material. In addition, the hold block comprises an adjustment elbow between the fixing element and the supporting element to allow adjustment of the angle between the planes defined by the fixing element and supporting element, and a locking element for locking this angle.

In a preferred case, both the planar fixing element and the planar supporting element are provided with elongated fitting holes permitting accurate adjustment of the fastening position in the elongated hole. The elongated fitting holes may be straight or curved apertures and their number may vary from one to a few both in the fixing element and in the supporting element. In an embodiment, the fitting hole in the fixing element is implemented as a hole elongated in a direction perpendicular to the adjustment elbow, and the fitting hole in the supporting element is implemented as a hole elongated in the longitudinal direction of the adjustment elbow.

One or more of the edges of the plate-like fixing element and supporting element are preferably provided with stiffeners formed e.g. by bending the edges of the these plate-like elements into an angle of e.g. 90°. Preferably at least the two parallel edges next to the adjustment elbow, in both the fixing element and the supporting element, are provided with such stiffeners.

The adjustment elbow, i.e. the connecting part or bend between the fixing element and supporting element, is preferably made of one and the same rigid and strong material as the fixing element and supporting element themselves. However, since the adjustment elbow must permit bending of the fixing element and supporting element relative to each other, the adjustment elbow may be provided with a suitable reduced strength area, such as a hole, perforation or cut-out to facilitate the adjustment.

The adjustment elbow, i.e. the angle between the fixing element and the supporting element, is preferably locked by means of the stiffeners at the edges of these elements, although the locking can also be implemented using separate locking elements or means. Thus, the locking element preferably consists of lock holes provided in adjacent stiffeners and aligned with each other and fixing elements, such as screw bolts or equivalent, fitted in the lock holes. The lock holes are preferably of an elongated shape and, in adjacent stiffeners to be locked to each other, disposed in substantially different orientations relative to each other so that, regardless of the bending angle of the adjustment elbow, the lock holes will always be in alignment with each other and can therefore be locked together with a fastening element. It is also possible to provide one of the stiffeners with only a hole while the elongated hole in the other stiffener is of a curved shape with a curvature in the bending direction of the adjustment elbow.

In an embodiment of the invention, the hold block comprises two fixing elements rigidly connected together which can be used alternatively for mounting a structural elevator component. In this case, both fixing elements are provided with separate supporting elements disposed at opposite ends of the fixing elements, i.e. parallel to each other and at a distance from each other determined by the fixing elements. Thus, the hold block forms a body substantially having the shape of a parallelopiped, e.g. a rectangular parallelopiped, in which the fixing elements connected together constitute two faces and the parallel supporting elements at the ends of the fixing elements constitute another two faces. The remaining two faces are partially open and partially defined by the stiffeners formed by the bent edges of the fixing elements.

Moreover, by giving the equal-sized planar supporting elements at opposite ends of the fixing element preferably a rectangular form substantially differing from the square form, one of the supporting elements is joined to its fixing element via an adjustment elbow on its shorter side while the other supporting element is joined to its fixing element via an adjustment elbow on its longer side. The result is a hold block that provides a large adjustment range e.g. when used for the mounting of a door sill.

If the door sill is relatively narrow, i.e. the space between the wall of the elevator shaft and the car is relatively small, then the door sill is mounted on that end of the hold block where the supporting element is connected to its fixing element by its longer side. Again, if a wider support for the door sill is required, then the hold block is turned the other way round and fixed to the shaft wall or an equivalent structure by its second fixing element so that the supporting element is connected to its fixing element by its narrower side, in which case the supporting element extends farther from the base to which the hold block is fixed.

The hold block of the invention preferably consists of a single continuous metal plate worked and bent into a certain shape. Of course, it is possible within the scope of the inventive idea to implement the hold block by making it from two or more parts and welding them together, although this would not be sensible for technical reasons relating to manufacture.

The hold block of the invention has significant advantages as compared with prior art. In elevator installations, a single hold block as provided by the invention will replace as many as tens of different mounting pieces needed so far for the mounting of the same elevator components. Until now, it has been necessary to include a sufficient number of various mounting pieces in elevator installation shipments just in case they should be needed, to ensure that the elevator can be installed regardless of possible variations in the dimensions of the base on which the components are to be mounted. As the hold block of the invention is suited for use in all different installations, savings will be made in the costs of materials, delivery and manufacture as well as installation, which is made easier and faster and also more accurate and precise than before.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention ill become apparent to those skilled in the art from this detailed description.

BRIEF DESCRIPTION OF THE DRAWINGS

In the following, the invention will be described in detail with reference to the drawings, which are given by way of illustration only, an thus are not limitative of the present invention, and wherein.

DETAILED DESCRIPTION

Figure 1:
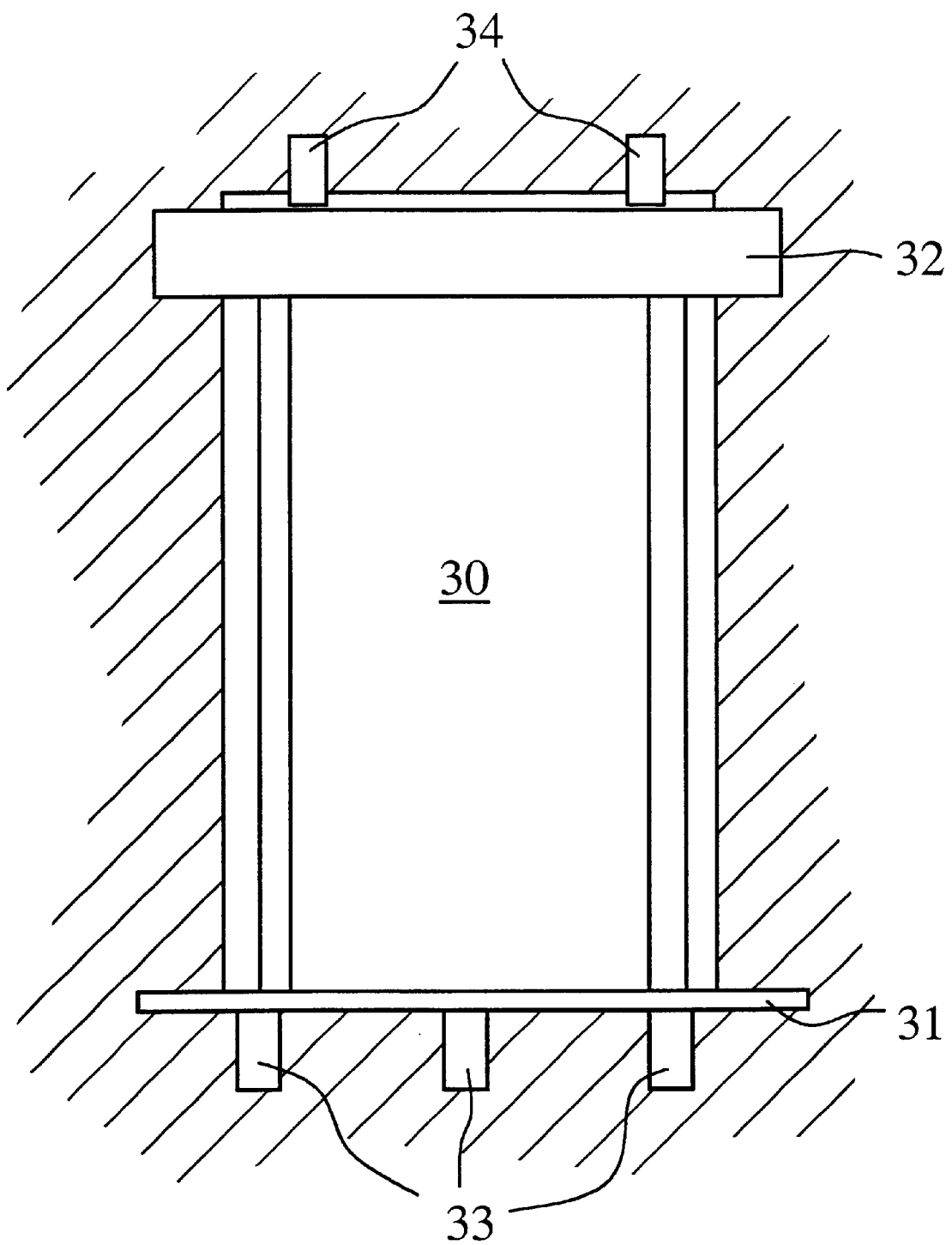
FIG. 1 is a diagram illustrating the use of the hold block of the invention.

As shown in FIG. 1, the hold block of the invention can be used for fastening a d or sill 31 and an over-head supporter 32 to a landing door opening 30 and for adjusting them to the correct height. The hold block 33 is fixed to the wall of the elevator shaft or to the floor below the door opening 30, whereupon the door sill 31 can be fastened to the hold block. In the same way, hold blocks 34 according to the invention are fixed to the upper edge of the door opening 30 or alternatively to the upper part of the lateral edges of the opening, and the overhead supporter 32 is then fastened to the hold blocks.

Figure 2:
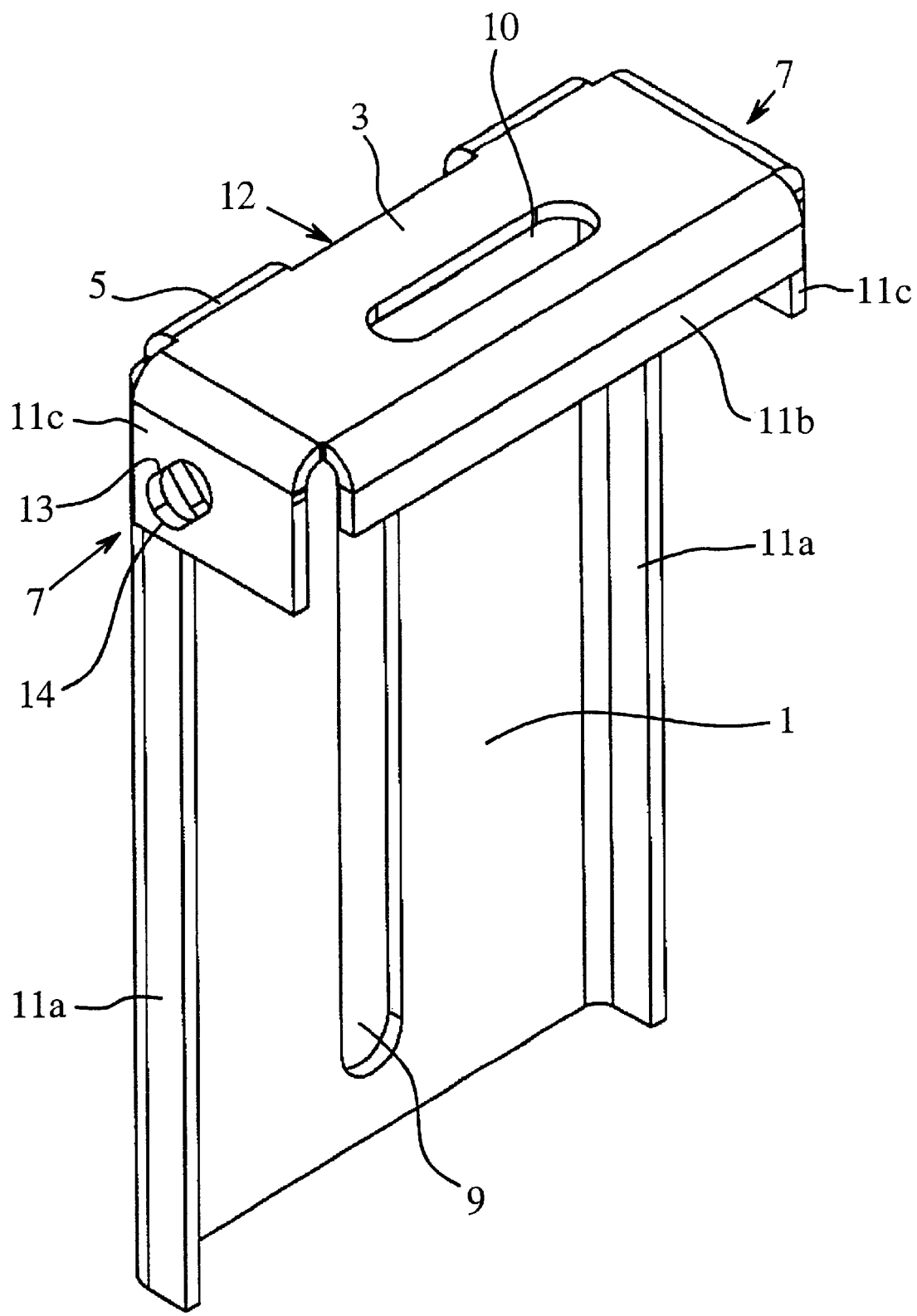
FIG. 2 presents a hold block according to the invention.

FIG. 2 presents a hold block according to the invention, made from a single continuous steel plate by cutting, punching or flame-cutting and bending. The hold block comprises a plate-like fixing element, i.e. a rectangular plate. Both of its longer edges have been bent to an angle, preferably 90°, to form stiffeners 11a, and in the middle of the fixing element there is an elongated hole, i.e. a fitting hole 9 in a parallel orientation with the stiffeners, permitting the hold block to be fixed to a base e.g. by means of bolts. One of the shorter edges of the fixing element 1 forms an adjustment elbow 5 connecting a plate-like rectangular supporting element 3 to the fixing element 1. The supporting element, too, is provided with a central fitting hole 10 elongated in the longitudinal direction of the adjustment elbow 5. The fixing element 1 and the supporting element 3 are substantially at an angle of 90° to each other, but this angle can be varied about the adjustment elbow 5. The adjustment elbow is not a continuous plate but is provided with an aperture 12 in the middle to facilitate the adjustment of the angle between the fixing element and the supporting element.

In the plate-like rectangular supporting element 3, the edge opposite to the adjustment elbow 5 has been bent to form a stiffener 11b, preferably at an angle of 90°. Similarly, the edges at opposite ends of the supporting element 3, i.e. the edges perpendicular to the adjustment elbow 5, have been bent to an angle, preferably 90°, to form stiffeners 11c. Thus, stiffeners 11a and 11c are parallel and adjacent to each other so that the outer surface of stiffeners 11a and the inner surface of stiffeners 11c lie against each other substantially in contact with each other. When the fixing element 1 and supporting element 3 are turned relative to each other about the adjustment elbow 5, stiffeners 11a and 11c will move in relation to each other while still remaining substantially in contact with each other.

Stiffeners 11a and 11c are provided with locking elements 7 to allow the angle between the fixing element 1 and the supporting element 3 to be locked after being adjusted to the desired magnitude. The locking element 7 consists of an elongated hole 13 in stiffener 11c and another elongated hole 14 in stiffener 11a, these elongated holes being substantially oriented in different directions, e.g. perpendicular to each other. Moreover, the locking element comprises e.g. a bolt and nut, which are not shown in the figure, by means of which the stiffeners 11a and 11c can be fastened to each other, thus rigidly locking the supporting element 3 with respect to the fixing element 1.

The hold block presented in FIG. 2 is used as follows. The fixing element 1 of the hold block is first loosely connected to the base in approximately the correct position with a bolt through the fitting hole 9. After this, the hold block can be raised or lowered and turned in a vertical plane about the bolt to adjust the line defined by the adjustment elbow 5 to a horizontal direction and to the correct height. The hold block 1 is then tightened in place on the base by means of the bolt.

When the line formed by the adjustment elbow 5, i.e. the edge of the plane 1 formed by the supporting element 3, is in the correct position, the whole supporting element can be turned to a horizontal plane and to the correct position by bending it about the adjustment elbow 5 in relation to the fixing element 1. Once the plane defined by the supporting element 3 has been made horizontal, it is rigidly locked with respect to the fixing element 1 by means of the locking elements 7, in other words, the stiffeners 11a and 11c at the edges of the fixing element 1 and supporting element 3 are tightened and locked together. In this way, the required number of hold blocks are fixed to the base structure at a distance from each other so as to form a straight and rigid mounting base e.g. for a landing door sill.

Figure 3:
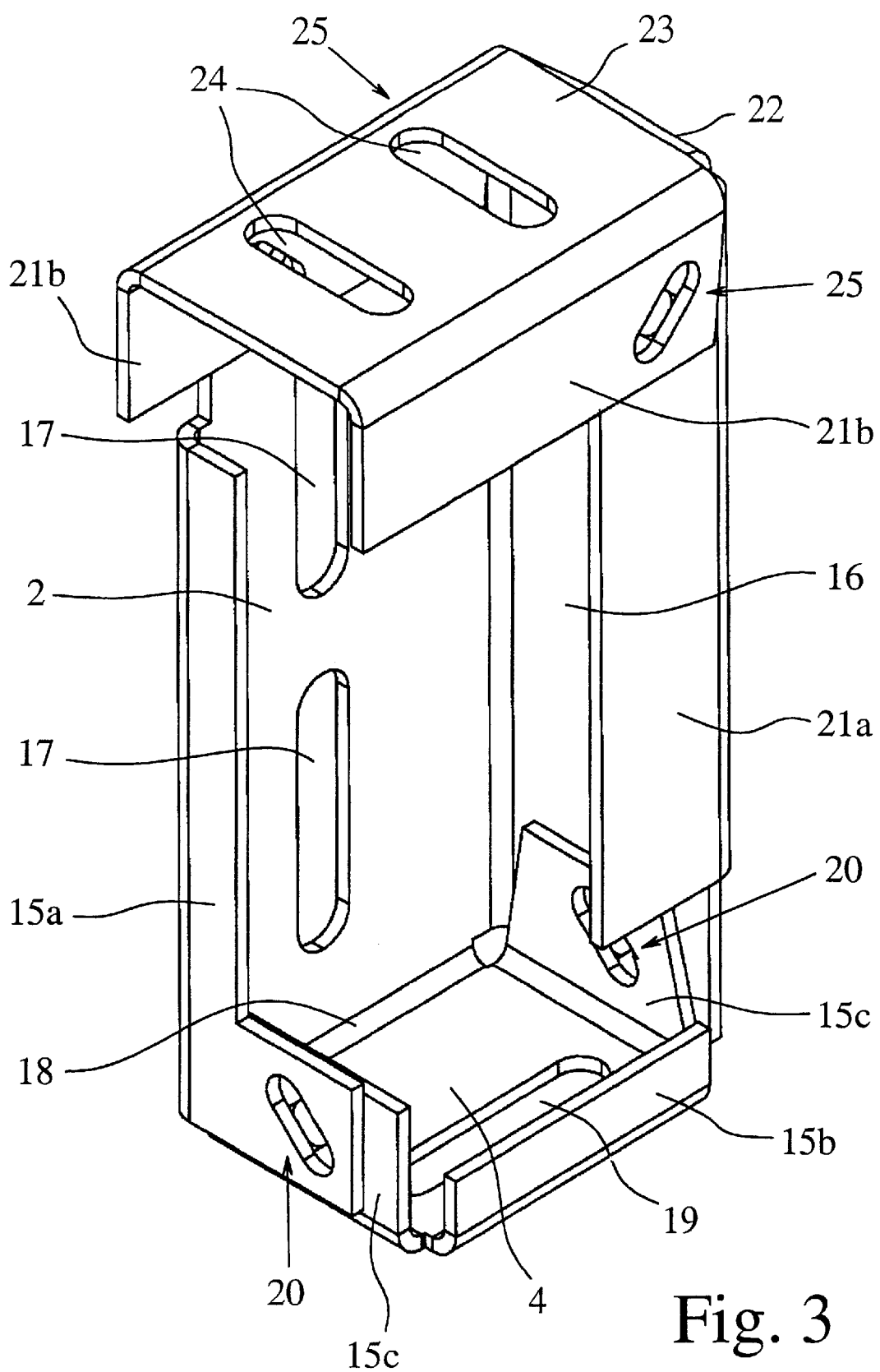
FIG. 3 presents another hold block according to the invention.

FIG. 3 presents another embodiment of the invention, in which the hold block has been manufactured from a single continuous steel plate by machining and bending. The hold block comprises a plate-like fixing element 2, i.e. a rectangular plate. Both of its longer edges are bent to an angle, preferably 90°, in the same direction so as to form a relatively narrow stiffener 15a at one edge and a wider, planar, rectangular plate at the other edge, forming a second fixing element 16 in the hold block. Thus, fixing elements 2 and 16 mutually constitute stiffeners for each other at one of their longer edges.

Fixing element 2 is provided with two elongated holes, i.e. fitting holes 17, placed one after the other in a direction parallel to its longer edges, permitting the hold block to be fastened to a base e.g. by means of bolts going through these holes. Similarly, the second fixing element 16 is provided with corresponding fitting holes, though these are not visible in the drawing.

At one of the shorter edges of fixing element 2 there is an adjustment elbow 18 connecting a plate-like rectangular supporting element 4 to the fixing element 2. Fixing element 2 and supporting element 4 are substantially at an angle of 90° each other, but this angle can be adjusted by turning the elements about the adjustment elbow 18.

In the plate-like rectangular supporting element 4, the edge opposite to the adjustment elbow 18 has been bent into an angle, preferably 90°, to form a stiffener 15b. Similarly, the other two opposite edges of supporting element 4, i.e. the edges perpendicular to adjustment elbow 18, have been bent into an angle of preferably 90° toward supporting element 2 to form stiffeners 15c. Thus, stiffeners 15a and 15c at one edge of the hold block and stiffener 15c and fixing element 16 are parallel and adjacent to each other so that the outer surfaces of stiffeners 15c and the inner surfaces of stiffener 15a and fixing element 16 lie against each other substantially in contact with each other. Supporting element 4 is also provided with a fitting hole 19 elongated in a direction parallel to the adjustment elbow 18.

Stiffeners 15a and 15c as well as stiffener 15c and fixing element 16 are provided with locking elements 20 disposed oppositely to each other to allow the angle between fixing element 2 and supporting element 4 to be locked after it has been adjusted to the desired magnitude. In a manner corresponding to the embodiment illustrated in FIG. 2, the locking element 20 consists of holes aligned with each other in the plate-like surfaces and e.g. bolts and nuts, by means of which stiffeners 15a and 15c and fixing element 16 can be tightened against each other, thus locking the supporting element 4 so as to make it rigid with respect to fixing element 2.

The other edge of the second rectangular fixing element 16 forming a stiffener at one edge of fixing element 2 has been bent to an angle of preferably 90° to form a stiffener 21a substantially parallel to the stiffener 15b at the edge of supporting element 4 and substantially in the same plane with it. At the edge of fixing element 16 opposite to the locking element 20 there is an adjustment elbow 22 connecting the fixing element 16 to a plate-like rectangular supporting element 23. Fixing element 16 and supporting element 23 are substantially at an angle of 90° to each other, but this angle can be adjusted by turning the elements about the adjustment elbow 22. Thus, supporting element 23 is a rectangular plate substantially the size of supporting element 4 and parallel to it, connected by its shorter edge to fixing element 16 while supporting element 4 is connected by its longer edge to fixing element 2.

In the plate-like rectangular supporting element 23, the opposite edges perpendicular to the adjustment elbow 22 are bent to an angle of preferably 90° toward fixing element 16 to form stiffeners 21b. Thus, stiffeners 21a and 21b at one edge of the hold block and stiffener 21b and fixing element 2 at the other edge are parallel and adjacent to each other so that the surfaces of stiffeners 21b and the corresponding surfaces of stiffener 21a and fixing element 2 lie against each other substantially in contact with each other. Supporting element 23 is also provided with a fitting hole 24 elongated in a direction parallel to the longitudinal direction of the adjustment elbow 22.

Stiffeners 21a and 21b as well as stiffener 21b and fixing element 2 are provided with locking elements 25 disposed oppositely to each other to allow the angle between fixing element 16 and supporting element 23 to be locked after it has been adjusted as desired. In a manner corresponding to the embodiment illustrated in FIG. 2, the locking element 25 consists of holes aligned with each other in the plate-like surfaces and e.g. bolts and nuts, by means of which stiffeners 21a and 21b and fixing element 2 can be tightened against each other, thus locking the supporting element 23 so as to make it rigid with respect to fixing element 16.

The essential point about versatile use of the hold block in FIG. 3 is that, as the shape of the hold block is substantially that of a rectangular parallelopiped, the plate-like supporting elements 4 and 23 at its opposite ends clearly differ from the square form, in other words, the mutually perpendicular edges of the rectangle formed by the plates are of clearly different lengths, e.g. the length of the longer edges equaling about twice the length of the shorter edges. When a relatively narrow door sill is to be mounted, fixing element 2 and the supporting element 4 connected to it via adjustment elbow 18 are used, in which case the supporting element 4 extends to a short distance from the plane defined by fixing element 2.

On the other hand, when a door sill of a larger width is to be mounted and a wider supporting area is needed, fixing element 16 and the supporting element 23 connected to it via adjustment elbow 22 are used. In this case, the supporting element 23 extends to a substantially larger distance from the plane defined by the fixing element 16, the supporting element 23 can be adjusted in the same way to a given horizontal plane by bending the adjustment elbow 22 and rigidly locked in relation to the fixing element 16 by means of locking elements 25. Thus, by designing a hold block as illustrated in FIG. 3 that has supporting elements 4 and 23 with appropriate length and width dimensions, it will be possible to use one and the same hold block in practically all mounting applications for the mounting of the landing door sill, the overhead structure of the landing door opening and the car door sill, which have so far been implemented using as many as several tens of different hold blocks.

In the foregoing, the invention has been described by way of example with reference to the attached drawings while different embodiments of the invention are possible within the scope of the inventive idea defined in the claims.

What is claimed is:
1. A hold block for fastening a structural elevator component to a base, the hold block comprising:
   a fixing element fixable to the base;
   a supporting element disposed at an angle relative to the fixing element, the supporting element being attachable to the structural component, both the fixing element and the supporting element being made of a same continuous plate from a single piece bent to shape;

an adjustment below between the fixing element and the supporting element to allow adjustment of the angle between the fixing element and the supporting element; and a locking element for locking the angle between the fixing element and the supporting element, the locking element including overlapping lock holes on the fixing element and the supporting element and tightening elements which are fitted into the lock holes to prevent pivoting of the fixing element relative to the supporting element.

2. The hold block as defined in claim 1, wherein the fixing element and the support element are metal.

3. The hold block as defined in claim 1, wherein the structural component is one of a landing door sill, an overhead structure of a landing door opening and a car door sill and wherein the hold block further comprises at least one elongated fitting hole for allowing movement of the supporting element relative to the structural component.

4. The hold lock as defined in claim 1, further comprising elongated fitting holes in the fixing element and the supporting element for allowing movement of the hold block relative to at least one of the base and the structural component.

5. The hold block as defined in claim 4, wherein at least one of the elongated fitting holes extends in a direction perpendicular to the adjustment elbow.

6. The hold block as defined in claim 5, wherein the at least one elongated fitting hole is in the fixing element.

7. The hold block as defined in claim 4, wherein at least one of the elongated fi ting holes extends in a direction parallel to a longitudinal direction of the adjustment elbow.

8. The hold block as defined in claim 7, wherein the at least one elongated fitting hole is in the supporting element.

9. The hold block as defined in claim 1, wherein the fixing element has a plate shape and has edges with stiffeners.

10. The hold block as defined in claim 9, wherein the stiffeners are bent at an angle of 90° relative to the plate shaped fixing element.

11. The hold b k as defined in claim 9, wherein the fixing element has two parallel edges and wherein the stiffeners are provided at both of the parallel edges adjacent to the adjustment elbow.

12. The hold block as defined in claim 9, wherein the supporting element further has edges with stiffeners.

13. The hold block as defined in claim 1, wherein the supporting element has edges with stiffeners.

14. The hold block as defined in claim 13, wherein the stiffeners are bent at an angle of 90° relative to the supporting element.

15. The hold block as defined in claim 13, wherein the supporting element has two parallel edges and wherein the stiffeners are provided at both of the parallel edges adjacent to the adjustment elbow.

16. The hold block as defined in claim 1, wherein the adjustment elbow comprises an area of reduced strength to allow bending of the adjustment elbow.

17. The hold block as defined in claim 16, wherein the area of reduced strength is one of a hole, perforation or cut-out.

18. The hold block as defined in claim 1, wherein the fixing element and the supporting element each have at least one stiffener at edge thereof and wherein the lock holes are provided in adjacent stiffeners and wherein the tightening elements are fitted in the lock holes.

19. The hold block as defined in claim 1, wherein the fixing element and the supporting element each have a pair of stiffeners at parallel edges thereof and wherein the lock holes are provided in each of the stiffeners and wherein the tightening elements are fitted in adjacent lock holes.

20. The hold block as defined in claim 1, wherein an additional fixing element and additional supporting element are provided such that the hold block has two fixing elements and two supporting elements, the two fixing elements being rigidly connected to one another and the supporting elements being disposed at ends of the fixing elements.

21. The hold block as defined in claim 20, wherein the two fixing elements are deposed at an angle of 90° relative to each other and wherein the two supporting elements are oriented in substantially parallel directions.

22. The hold block as defined in claim 20, wherein the two supporting elements are at opposite ends of the hold block and have different sizes.

23. The hold block as defined in claim 22, wherein the two supporting elements have a rectangular shape.

24. The hold block as defined in claim 1, wherein overlapping lock holes extend in opposite directions.

25. The hold block as defined in claim 1, wherein at least one of the lock holes are provided on two opposed sides of the fixing element.

* * * * *